United States Patent
Ogura et al.

(10) Patent No.: US 9,300,860 B2
(45) Date of Patent: Mar. 29, 2016

(54) IMAGE-CAPTURING APPARATUS (71) Applicant: Panasonic Corporation, Osaka (JP)

(72) Inventors: Motonori Ogura, Osaka (JP); Koichi Toyomura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/481,960

(22) Filed: Sep. 10, 2014

(65) Prior Publication Data
US 2015/0281552 A1 Oct. 1, 2015

(30) Foreign Application Priority Data

Mar. 28, 2014 (JP) ................. 2014-068188
Aug. 18, 2014 (JP) ................. 2014-165711

(51) Int. Cl.
H04N 5/232 (2006.01)

(52) U.S. Cl.
CPC .................. *H04N 5/23212* (2013.01)

(58) Field of Classification Search
CPC ..................................... H04N 5/232
See application file for complete search history.

(56) References Cited

U.S. PATENT DOCUMENTS

| | | | | |
|---|---|---|---|---|
| 4,783,677 A * | 11/1988 | Hamada | ............... | G02B 7/36 396/95 |
| 5,227,828 A | 7/1993 | Kirigaya | | |
| 6,507,366 B1 * | 1/2003 | Lee | ............... | G06T 7/2013 348/169 |
| 8,724,981 B2 * | 5/2014 | Itoh | ............... | G03B 13/36 396/95 |
| 2011/0305446 A1 * | 12/2011 | Itoh | ............... | G03B 13/36 396/95 |

FOREIGN PATENT DOCUMENTS

| | | |
|---|---|---|
| JP | 02-118610 | 5/1990 |
| JP | 2005-215373 | 8/2005 |
| JP | 2010-177741 | 8/2010 |
| JP | 2011-015163 | 1/2011 |

* cited by examiner

*Primary Examiner* — James Hannett
(74) *Attorney, Agent, or Firm* — Wenderoth, Lind & Ponack, L.L.P.

(57) ABSTRACT

An image-capturing apparatus includes a focus lens that focuses on an object as to form an object image from the object, an image sensor that captures the object image as to produce image data, and a controller that controls the focus lens. The controller determines a tracking range based on a position of a particular object. The controller causes the focus lens to focus on a certain object when the certain object is located in the tracking range. The controller does not cause the focus lens to focus on the certain object when the certain object is located out of the tracking range. The controller determines whether or not the position of the particular object changes. The controller updates the tracking range in response to the position of the particular object if determining that the position of the particular object changes. The controller maintains the tracking range if determining that the position of the particular object does not change.

4 Claims, 9 Drawing Sheets

IMAGE-CAPTURING APPARATUS

TECHNICAL FIELD

The present invention relates to an image-capturing apparatus.

BACKGROUND ART

Japanese Patent Laid-Open Publication No. 2011-15163 discloses an image-capturing apparatus that employs a system of depth From Defocus (DFD) method. This image-capturing apparatus implements a focus control that obtains plural defocusing, and includes an image-capturing device for capturing plural images defocusing differently from each other. The image-capturing apparatus then determine an object distance based on the plural images defocusing differently from each other. The image-capturing apparatus performs the focus control based on the determined object distance.

SUMMARY

An image-capturing apparatus includes a focus lens that focuses on an object as to form an object image from the object, an image sensor that captures the object image as to produce image data, and a controller that controls the focus lens. The controller determines a tracking range based on a position of a particular object. The controller causes the focus lens to focus on a certain object when the certain object is located in the tracking range. The controller does not cause the focus lens to focus on the certain object when the certain object is located out of the tracking range. The controller determines whether or not the position of the particular object changes. The controller updates the tracking range in response to the position of the particular object if determining that the position of the particular object changes. The controller maintains the tracking range if determining that the position of the particular object does not change.

This image-capturing apparatus provides a convenient focusing action based on the distance to the object.

DETAIL DESCRIPTION OF PREFERRED EMBODIMENT

An exemplary embodiment of the present invention will be detailed below with reference to the accompanying drawings. An excessive description is omitted. For instance, a description of a well-known subject in a public domain is omitted, or a description of a similar element to that discussed previously is omitted for avoiding redundancy and facilitating an ordinary skilled person in the art to understand the present invention.

The inventor(s) provides the accompanying drawings and the description for the ordinary skilled person in the art to fully understand the disclosure, so that these materials may not limit the scope of the claims.

A number of methods for measuring an object distance, a distance from an image-capturing apparatus to an object includes a depth from Defocus (DFD) method that utilizes correlation values of defocusing amounts generated in image captured with a camera. In general, a defocusing amount is uniquely determined for each image-capturing apparatus in response to a relation between a focal position and the object distance. In the DFD method utilizing the above characteristics, two images having different defocus amounts are produced, and the object distance is measured based on a point-spread function (PSF) and a difference in the defocusing amounts. The image-capturing apparatus in accordance with this embodiment measures the object distance by utilizing the DFD calculation to perform an auto-focus control.

A structure and operation of the image-capturing apparatus in accordance with the embodiment will be described below.

1. Electrical Structure of Image-Capturing Apparatus

Figure 1:
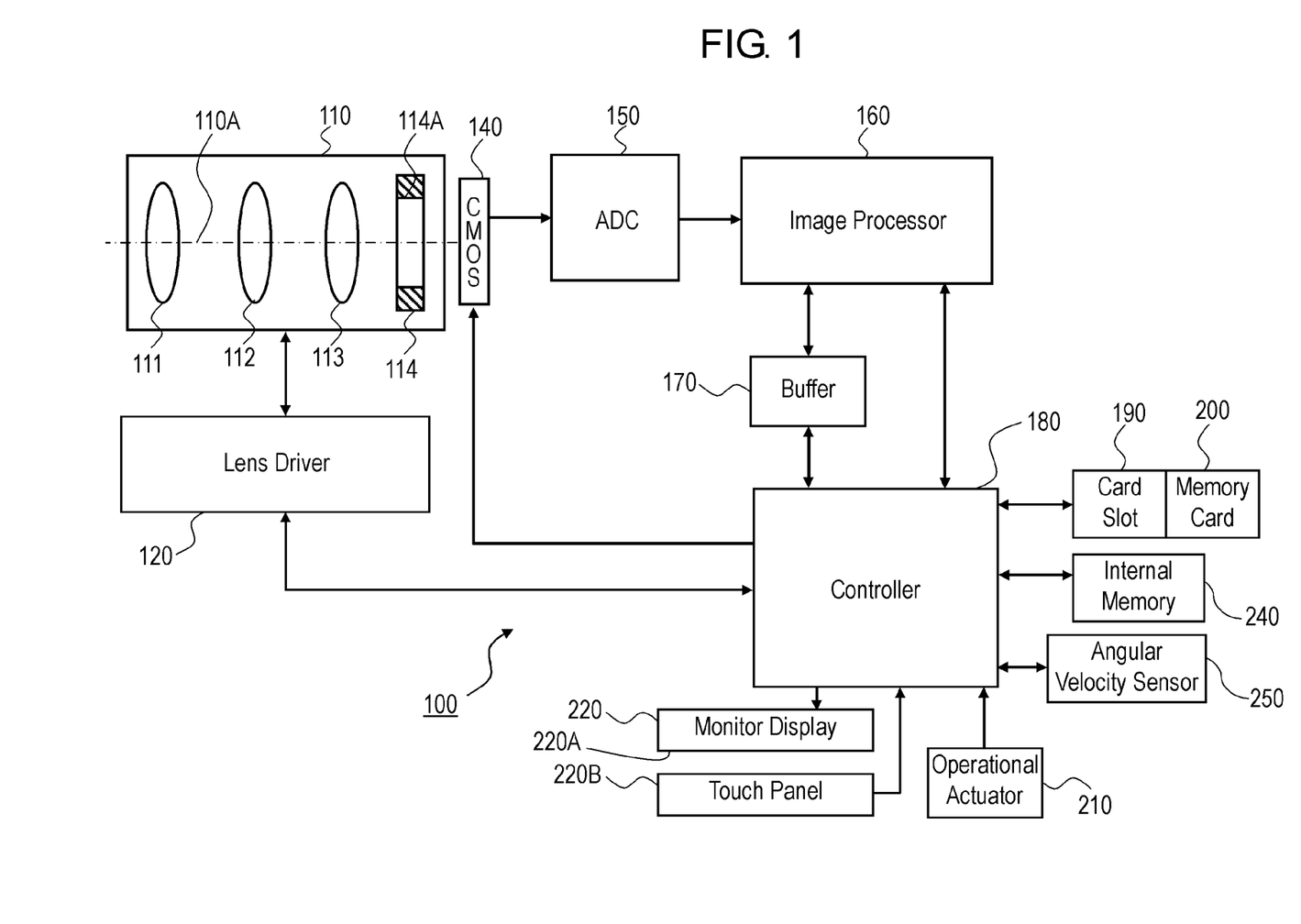
FIG. 1 is a block diagram of a digital video camera in accordance with an exemplary embodiment for illustrating an electrical structure of the digital video camera.

FIG. 1 is a block diagram of digital video camera 100, an image-capturing apparatus in accordance with the embodiment, for illustrating an electrical structure of digital video camera 100. Digital video camera 100 includes optical system 110 including at least one lens. Optical system 110 forms an object image on CMOS image sensor 140 by utilizing light from an object. The object image is captured with an image sensor, CMOS image sensor 140. CMOS image sensor 140 produces image data based on the captured object image. The image data produced by CMOS image sensor 140 is converted into a digital signal with ADC 150, and processed with image processor 160. The digital signal is stored in memory card 200. The structure of digital video camera 100 will be detailed below.

Optical system 110 in accordance with the embodiment includes zoom lens 111, camera-shake correcting lens 112, focus lens 113, and iris 114. Zoom lens 111 moves along optical axis 110A to enlarge and reduce the object image. Focus lens 113 moves along optical axis 110A to adjust a focus of the object image. Camera-shake correcting lens 112 is movable within a plane perpendicular to optical axis 110A of optical system 110. Camera-shake correcting lens 112 moves along a direction in which a shake of digital video camera 100 is cancelled as to reduce an influence caused by the shake of camera 100 on the captured image. Iris 114 has opening 114A therein disposed on optical axis 110A, and adjusts the size of opening 114A automatically or according to a user's setting, so that iris 114 can adjust an amount of light transmitting through iris 114.

Lens driver 120 includes a zoom actuator that drives zoom lens 111, a camera-shake correcting actuator that drives camera-shake correcting lens 112, a focus actuator that drives focus lens 113, and an iris actuator that drives iris 114. Lens driver 120 controls the zoom actuator, the camera-shake correcting actuator, the focus actuator, and the iris actuator.

CMOS image sensor 140 captures the object image formed by optical system 110, and produces analog image data in form of an analog signal. Image sensor 140 performs various operations, such as exposure, transfer, and electronic shutter.

A/D converter 150 converts the analog image data produced by CMOS image sensor 140 into digital image data in form of a digital signal.

Image processor 160 processes the image data produced by CMOS image sensor 140 to produce image data to be displayed on monitor display 220 and to produce image data to be stored in memory card 200. For instance, image processor 160 performs a gamma correction, a white-balance correction, and a flaw correction on the image data produced by CMOS image sensor 140. Image processor 160 compresses the image data produced by CMOS image sensor 140 by a compression method in accordance with H.264 standard or MPEG2 standard. Image processor 160 may be implemented by a DSP or a microprocessor.

Controller 180 controls entire digital video camera 100, and can be implemented by a semiconductor element. Controller 180 can be implemented by hardware, or by a combination of hardware and software. Controlled may be implemented by a microprocessor.

Buffer 170 functions as a working memory of image processor 160 and controller 180, and can be implemented by, e.g. a DRAM or a ferroelectric memory.

Card slot 190 holds memory card 200 detachably, and is mechanically or electrically connectable to memory card 200. Memory card 200 contains a flash memory or a ferroelectric memory therein, and stores data, such as an image file produced in image processor 160.

Internal memory 240 is implemented by a flash memory or a ferroelectric memory, and stores a control program that controls entire digital video camera 100. Internal memory 240 also stores point spread functions (PSFs).

Operational actuator 210 includes user interfaces, such as a cross key, an enter-button, for accepting operations by users.

Monitor display 220 has screen 220A that displays thereon an image indicated by the image data produced by CMOS image sensor 140 and an image indicated by the image data read out from memory card 200. Monitor display 220 displays various menus for setting functions of camera 100 on screen 220A. Touch panel 220B is disposed on screen 220A. Touch panel 220B is touched by a user for receiving various touch actions. An instruction entering through touch panel 220B as a touch action is supplied to controller 180 to be processed.

Angular velocity sensor 250 detects an angular velocity produced in digital video camera 100 due to a camera shake. The angular velocity detected by sensor 250 is supplied to controller 180. Controller 180 drives camera-shake correcting lens 112 to cancel a camera shake produced in digital video camera 100 due to the angular velocity.

2. Operations of Digital Video Camera 100

2-1. Auto-Focus Operations Utilizing a Result of the DFD Calculation

Figure 2:
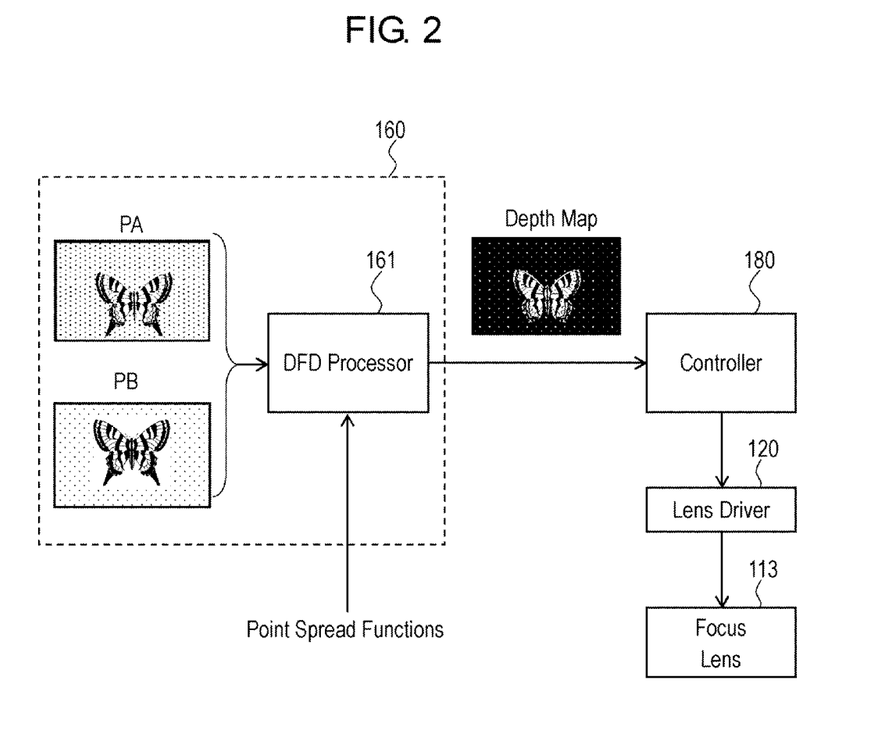
FIG. 2 is a block diagram of the digital video camera in accordance with the embodiment for illustrating an operation of the digital video camera.

Digital video camera 100 performs an auto-focus operation utilizing a result of the DFD calculation. FIG. 2 is a block diagram of digital video camera 100 for illustrating a control of the focus lens by utilizing the result of the DFD calculation.

DFD processor 161 is disposed in image processor 160, and performs the DFD calculation to produce a depth map. To be more specific, DFD processor 161 uses two images: observed image PA and reference image PB having different defocusing amounts produced intentionally by changing focal positions. DFD processor 161 produces the depth map based on observed image PA, reference image PB, and point spread functions (PSFs). The depth map indicates object distances at respective ones of pixels of observed image PA (reference image PB).

Then, DFD processor 161 supplies the depth map to controller 180. Controller 180 controls lens driver 120 as to drive focus lens 113 based on the depth map.

The DFD calculation performed by DFD processor 161 shown in FIG. 2 and the determination of the object distance by controller 180 will be detailed below.

Figure 3:
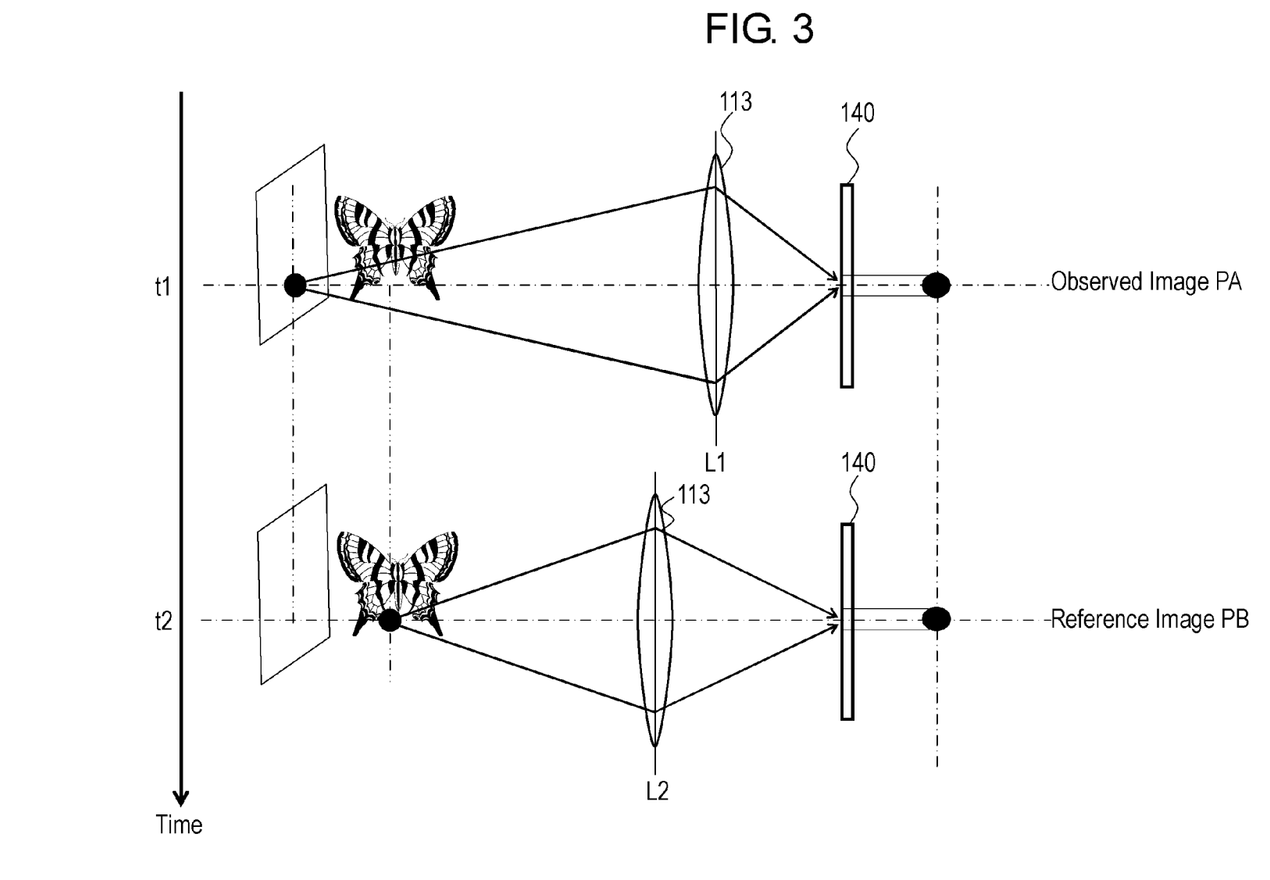
FIG. 3 is a schematic view of the operation of the digital video camera in accordance with the embodiment.

First, the DFD calculation performed by DFD processor 161 will be detailed. FIG. 3 is a schematic view of focus lens 113 of digital video camera 100 in accordance with the embodiment for illustrating the movement of focus lens 113 for the DFD calculation. Controller 180 changes a focal position based on the DFD calculation to intentionally produce two images having different defocusing amounts. To be more specific, as shown in FIG. 3, controller 180 controls lens driver 120 to locate focus lens 113 at focusing position L1 at time point t1. Similarly, focus lens 113 is located at focusing position L2 different from focusing position L1 at time point t2. CMOS image sensor 140 captures an image of the object when focus lens 113 is positioned at focusing position L1 for producing observed image PA. Similarly, image sensor 140 captures the image of the object when focus lens 113 is positioned at focusing position L2 for producing reference image PB. Although being produced by capturing the same object, images PA and PB have defocusing amounts different from each other due to different positions of focus lens 113 for the capturing.

Figure 4:
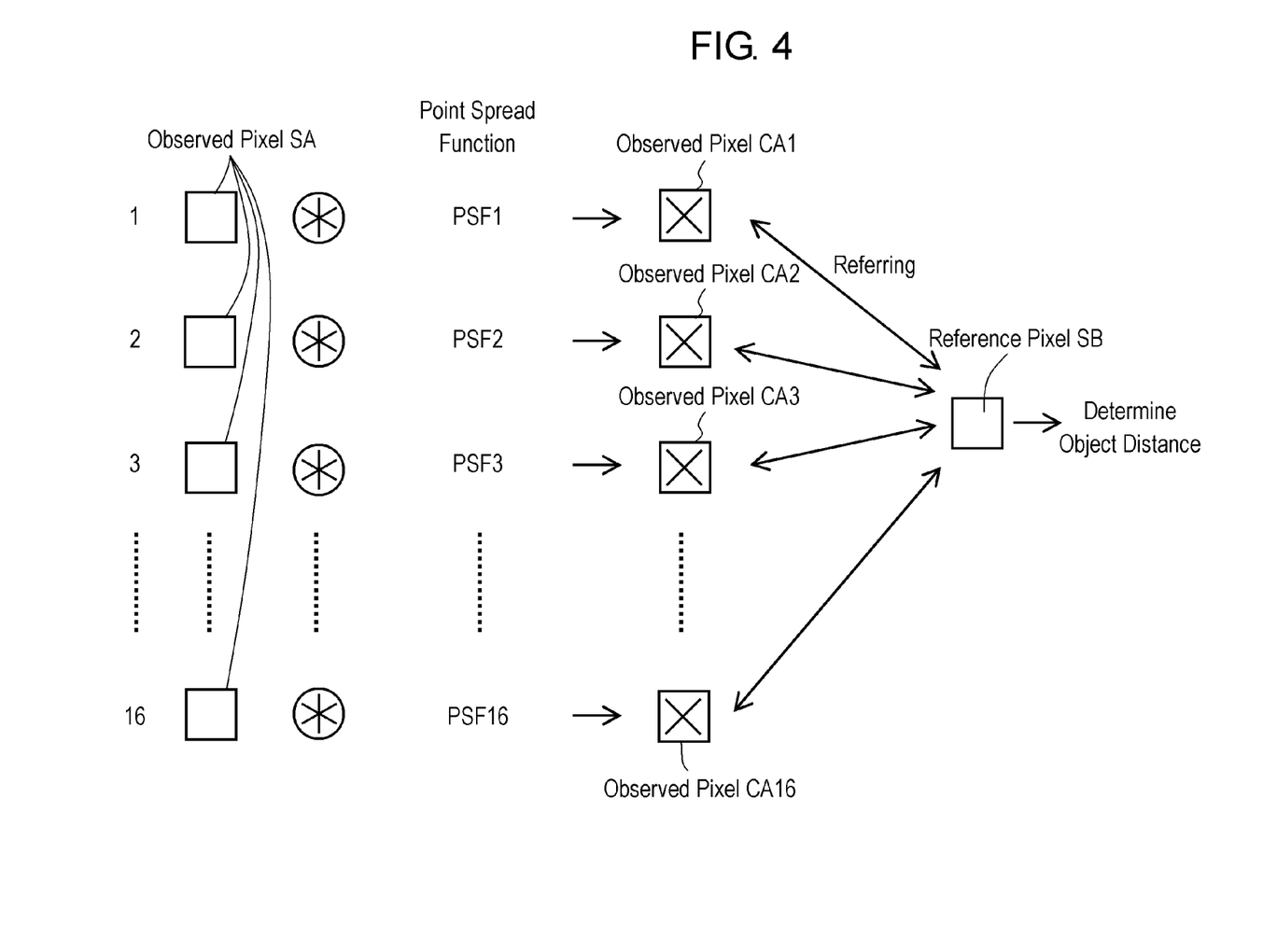
FIG. 4 is a schematic view of a DFD calculation executed by the digital video camera in accordance with the embodiment.

FIG. 4 is a schematic view for illustrating the calculation of the object distance by utilizing the DFD calculation performed by digital video camera 100 in accordance with the embodiment. DFD processor 161 performs the DFD calculation on observed pixels SA constituting observed image PA and reference pixels SB constituting reference image PB to determine the distances from respective ones of pixels SA (SB). DFD processor 161 produces plural observed pixels CA by convolutions of plural PSFs with observed pixels SA. DFD processor 161 compares plural observed pixels CA with reference pixels SB located at the same coordinates as pixels CA on the image. The above operation will be detailed below.

A point spread function (PSF) indicates a response to a point light source of an optical system, and indicates a change in a defocusing amount. A convolution of the PSF with an image corresponding to a combination of point light sources can intentionally produce a defocused image. According to the embodiment, a large number of point spread functions corresponding to a large number of distances to an object are previously provided in internal memory 240. Controller 180 separates distances to an object into sixteen steps, namely from the closest point to the farthest point, and selects sixteen point spread functions PSF1 to PSF16 corresponding to the sixteen steps out of the large number of point spread functions stored in memory 240. Controller 180 then supplies selected point spread functions PSF1 to PSF16 to DFD processor 161.

DFD processor 161 performs convolutions of point spread functions PSF1 to PSF16 with observed pixels SA as to produce sixteen observed pixels CA1 to CA16 corresponding to the object distances at respective ones of observed pixel SA. Since observed pixels CA1 to CA16 have point spread functions different from each other for convolution, observed pixels CA1 to CA16 form different defocused images.

DFD processor 161 then compares observed pixels CA1 to CA16 with reference pixel SB, and selects observed pixel CAn that has the smallest difference from reference pixel SB among observed pixels CA1 to CA16. DFD processor 161 determines the object distance corresponding to the point spread function for convolution producing observed pixel CAn as the distance to the object at observed pixel SA. For instance, if the difference between observed pixel CA3 and reference pixel SB is smaller than differences between reference pixel SB and each of other observed pixels CA1 to CA2, CA4 to CA16, then, DFD processor 161 determines that an object distance corresponding to point spread function PSF3 for convolution with observed pixel SA to produce observed pixel CA3 is the object distance at observed pixel SA. DFD processor 161 outputs distance data corresponding to the determined object distance.

DFD processor 161 performs the above operation on each observed pixels PA and reference pixels PB as to produce a depth map plotting respective object distances at the pixels. According to the embodiment, since sixteen point spread functions corresponding to distances to the object are used, the depth map exhibits sixteens levels of the object distances.

Figure 5:
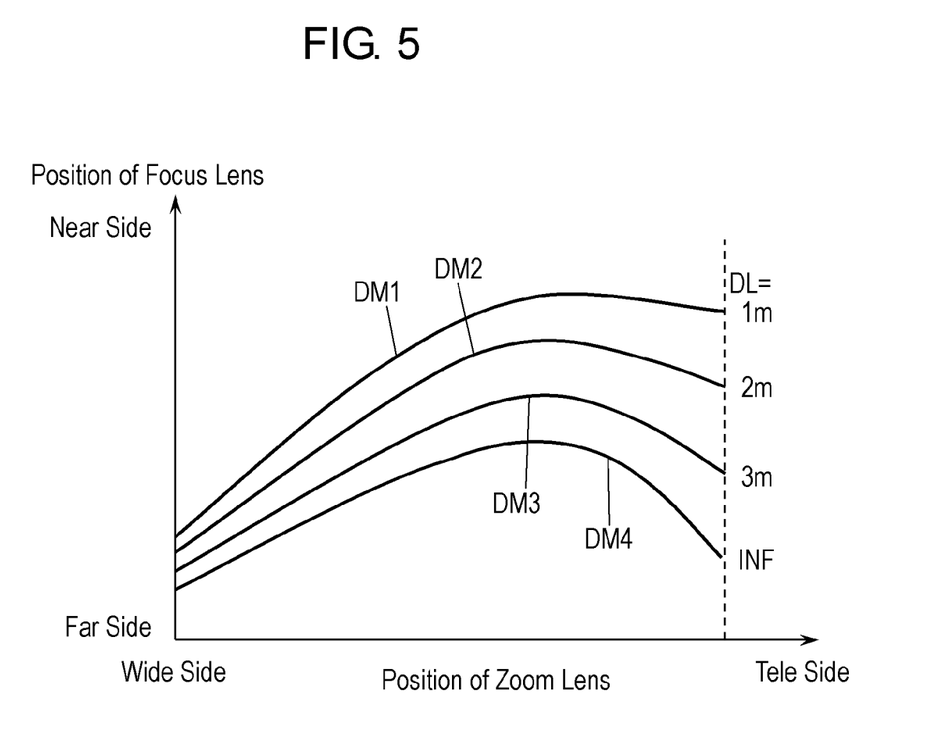
FIG. 5 is a zoom tracking table with respect to distances to plural object distances of the digital video camera in accordance with the embodiment.

Next, based on the object distance determined by the DFD calculation, controller 180 determines an in-focus position to which focus lens 113 is to move. To be more specific, controller 180 refers to a tracking table for calculating the in-focus position based on the determined object distance as well as a current position of focus lens 111. FIG. 5 is the zoom tracking table for plural object distances of digital video camera 100 in accordance with the embodiment. As shown in FIG. 5, profiles DM1 to DM4 indicate in-focus positions corresponding to a position of zoom lens 111 for typical distances DL to an object (1 m, 2 m, 3 m, and infinite shown in FIG. 5). Controller 180 can calculate in-focus positions for object distances other than the typical object distances DL by interpolation to the profiles shown in FIG. 5 with respect to the object distances.

Controller 180 determines the in-focus position based on the calculated object distance and the zoom tracking table, and controls lens controller 120 to move focus lens 113 to the in-focus position as to cause focus lens 113 to focus on the object.

2-2. Tracking of Focusing Operation

Digital video camera 100 detects a distance from digital video camera 100 to an object that is a tracking target, and updates a range of the object distance that is to be tracked with the focusing operation. Controller 180 of digital video camera 100 determines whether or not the focusing operation is tracked to the object within a frame. In the following description, a Z-axis is defined along optical axis 110A of optical system 110, and a direction from camera 100 toward the object is defined as a positive direction of the Z-axis.

Figure 6:
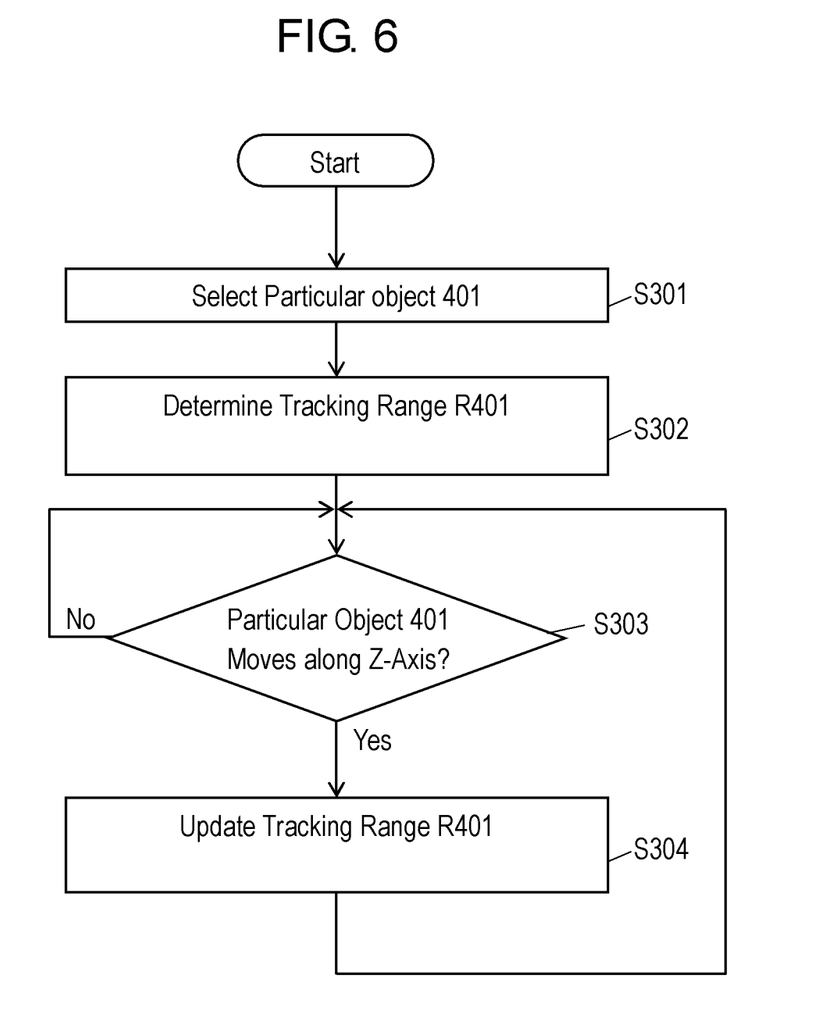
FIG. 6 is a flowchart of the operation of the digital video camera in accordance with the embodiment.
Figure 7A:
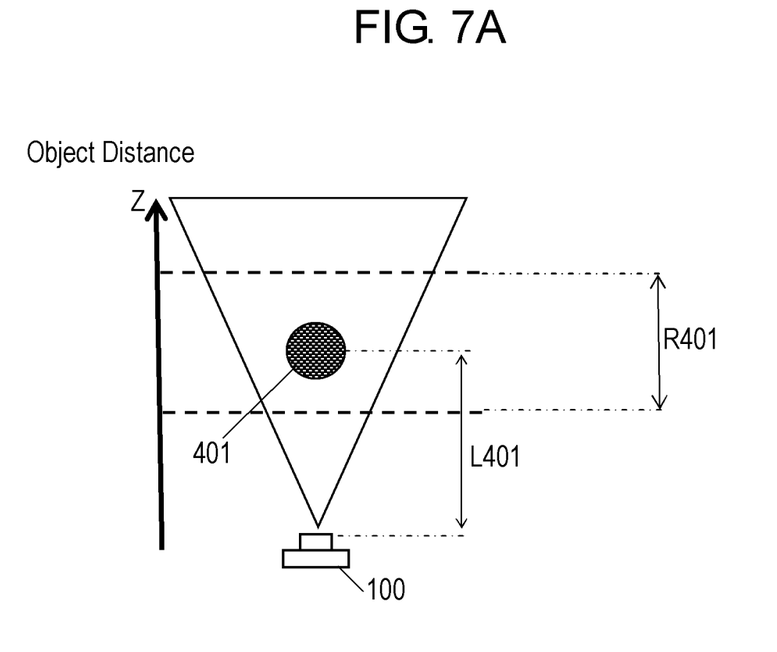
FIGS. 7A and 7B are schematic views of the operation of the digital video camera in accordance with the embodiment.
Figure 7B:
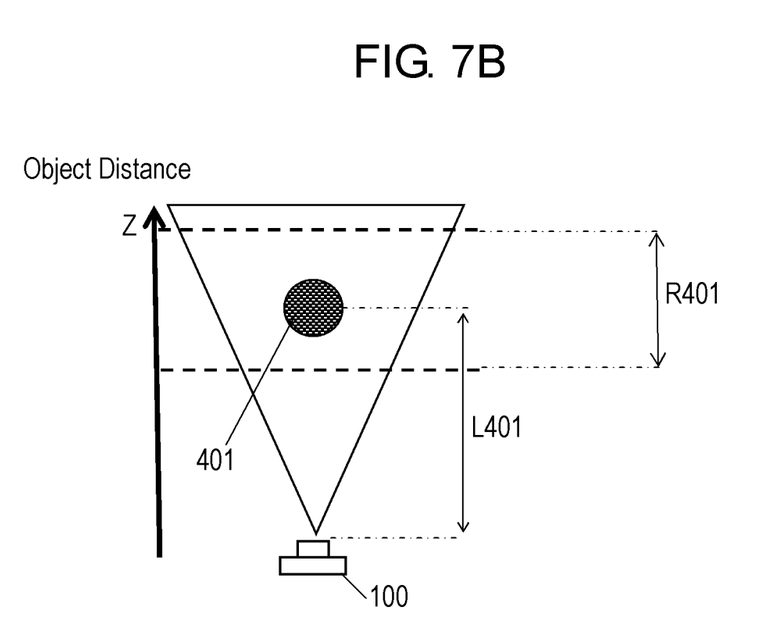

First, updating of the object distance range to be tracked by the focusing action will be detailed below. FIG. 6 is a flowchart of an operation of updating an object distance range to be tracked by the focusing operation. FIGS. 7A and 7B are schematic views for illustrating the operation of updating the object distance range that is tracked by the focusing operation.

A user touches touch panel 200B with a finger to select particular object 401 to be tracked by the focusing operation in a through-the-lens image displayed on monitor display 220 (step S301). Digital video camera 100 selects particular object 401 based on the object distance obtained by the DFD calculation. Controller 180 monitors a movement of object 401 based on distance (object distance) L401 from digital video camera 100 to particular object 401 selected by the user. For instance, when the user selects particular object 401 located at a position away from digital video camera 100 by 3 meters, controller identifies the shape of object 401 located at the position away by the distance of 3 meters. Controller 180 then monitors the movement of object 401 having the identified shape. Controller 180 thus monitors whether or not object 401 having the identified shape moves along a direction of the Z-axis. To improve the accuracy of monitoring particular object 401, an object tracking technique that detects a face or a color of object 401 can be additionally used.

Next, controller 180 determines a tracking range R401 of the object distance (step S302), as shown in FIG. 7A, by using the position of particular object 401 in a direction of the Z-axis as a reference position. The reference position may be a center of tracking range R401 along the Z-axis, or may a position which internally divides the range with a predetermined ratio along the Z-axis. Tracking range R401 may be established determined previously by controller 180, or may be determined manually by the user. In the case that the range is determined manually setting by the user, controller 180 may allow the user to select a numerical value that indicates object distance L401, or to select an object distance from plural object distances, obtained by the DFD calculation, of plural objects. According to this embodiment, controller 180 determines tracking range R401 within ±1 meter with respect to the position of particular object 401 in a direction of the Z-axis. In other words, controller 180 determines tracking range R401 of the object distance to be a range from 2 meters to 4 meters.

Controller 180 then determines whether or not particular object 401 moves along the Z-axis (step S303). If controller 180 determines that particular object 401 moves along the Z-axis ("Yes" of step S303), controller 180 updates tracking range R401 to be tracked by the focusing operation. For instance, in the case that particular object 401 moves along the Z-axis by +1 meter to move to a position away from camera 100 by 4 meters, controller 180 determines tracking range R401 to be within ±1 meter from particular object 401 in a direction of the Z-axis, and thus, updates tracking range R401 to a range from 3 meters to 5 meters along the Z-axis from digital video camera 100.

On the other hand, in the case that controller 180 does not determine that particular object 401 moves along the Z-axis at step S303, ("No" of step S303), controller 180 does not updates the tracking range as to maintain the tracking range.

Figure 8:
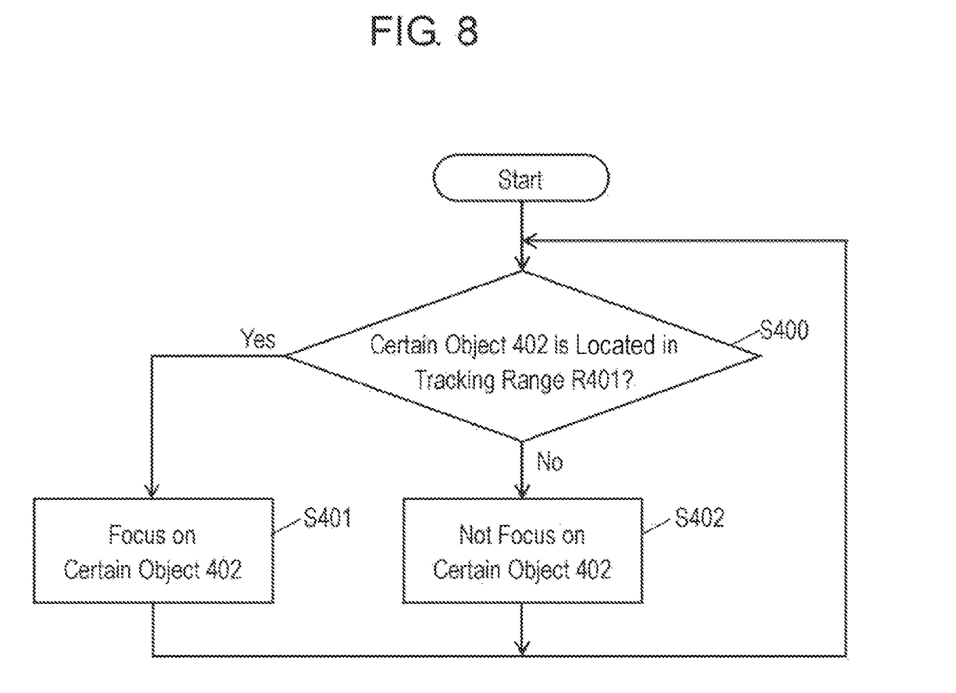
FIG. 8 is a flowchart of the operation of the digital video camera in accordance with the embodiment.
Figure 9A:
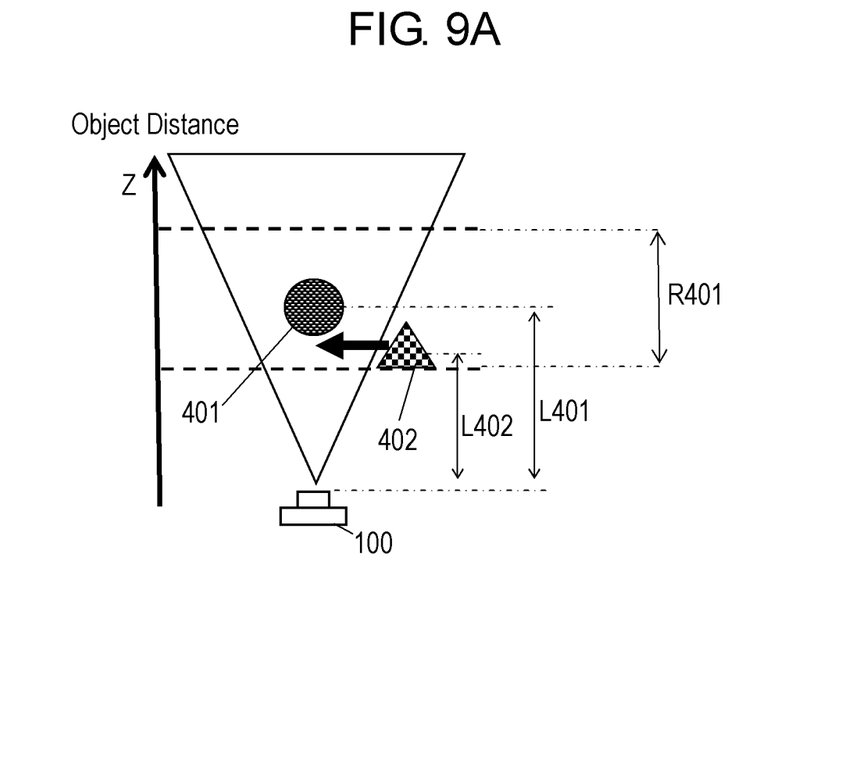
FIGS. 9A and 9B are schematic views of the operation of the digital video camera in accordance with the embodiment.
Figure 9B:
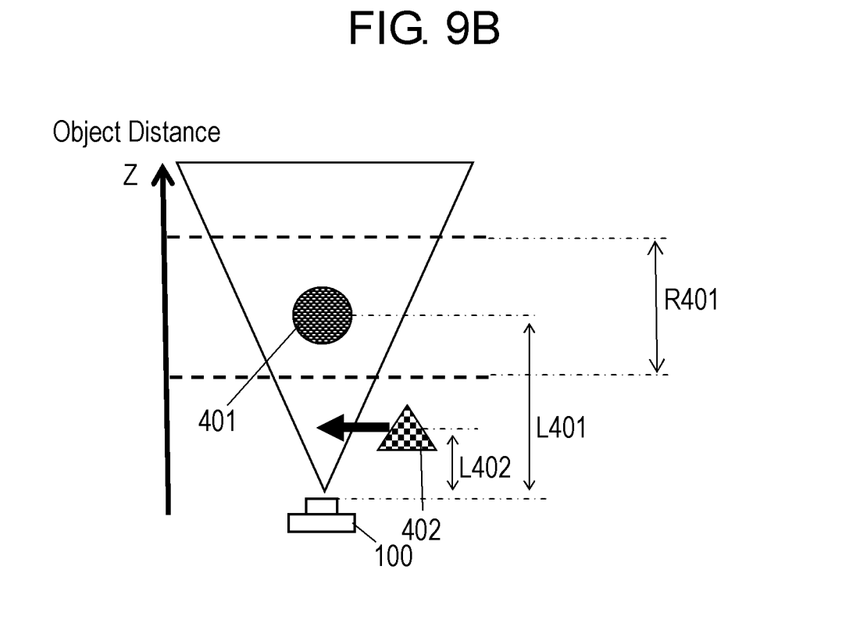

Next, an operation of digital video camera 100 to determining whether or not the tracking by the focusing action of camera 100 is necessary will be detailed below. FIG. 8 is a flowchart of an operation to determine the necessity of the tracking by the focusing action of digital video camera 100. FIGS. 9A and 9B are schematic views for illustrating an operation to determine the necessity of the tracking by the focusing action. As shown in FIGS. 9A and 9B, in the case that certain object 402 different from particular object 401 enters the frame, if a condition, such as a situation that certain object 402 reaches a predetermined position, such as the center of the frame, is met, controller 180 causes focus lens 113 to focus on certain object 402. In digital video camera 100 in accordance with this embodiment, controller 180 determines whether or not to cause focus lens 113 to focus on certain object 402 in the case that the condition of performing the focusing operation is met.

Controller 180 obtains object distance L402 which is a distance to certain object 402 in the frame by the DFD calculation as to detect a position of certain object 402 along the Z-axis. Then, controller 180 determines whether or not certain object 402 in the frame is located within tracking range R401 to be tracked by the focusing operation (step S400).

If controller 180 determines at step S400 that certain object 402 is located within tracking range R401, as shown in FIG. 9A, ("Yes" of step S400), controller 180 causes focus lens 113 to focus on certain object 402 (step S401). On the other hand, if controller 180 determines at step S400 that certain object 402 is not located within tracking range R401, in other words, certain object 402 is located out of tracking range R401, as shown in FIG. 9B ("No" of step S400), controller 180 does not cause focus lens 113 to focus on certain object 402 although object 402 is in the frame (step S402). The above operation avoids an unnecessary focusing operation caused by certain object 402 entering in the frame while particular object 401 needs to be focused on.

In the case that object 402 moves from tracking range R401 to the outside of range R401 while certain object 402 is located within tracking range R401 and focus lens 113 focuses on object 402, controller 180 may cause focus lens 113 to focus on particular object 401. Further, in the case that certain object 402 enters in tracking range R401 from the outside while controller 180 causes focus lens 113 to focus on particular object 401, controller 180 may cause focus lens 113 to focus on certain object 402.

As discussed above, digital video camera 100 as the image-capturing apparatus includes focus lens 113 that focuses on an object as to form an object image from the object, CMOS image sensor 140 as an image sensor that captures the object image as to produce image data, and controller 180 that controls the focus lens. Controller 180 is operable to determine tracking range R401 based on the position of particular object 401. Controller 180 is operable to cause focus lens 113 to focus on certain object 402 when certain object 402 is located in tracking range R401. Controller 180 is operable not to cause focus lens 113 to focus on certain object 402 when certain object 402 is located out of tracking range R401. Controller 180 is operable to determine whether or not the position of particular object 401 changes. Controller 180 is operable to update tracking range R401 in response to the position of particular object 401 if determining that the position of particular object 401 changes. Controller 180 is operable to maintain tracking range R401 if determining that the position of particular object 401 does not change.

Digital video camera 100 may further include image processor 160. Focus lens 113 focuses on particular object 401 as to form plural object images when the focus lens is located at positions L1 and L2, respectively. CMOS image sensor 140 captures the plural object images as to produce plural image data, respectively. Image processor 160 is operable to determine a defocusing amount based on the plural image data, and to produces distance data corresponding to the distance to particular object 401 based on the determined defocusing amount. In this case, controller 180 determines, based on the distance data, whether the position of particular object 401 changes or not.

3. Advantage

As discussed above, digital video camera 100 in accordance with this embodiment includes focus lens 113, CMOS image sensor 140 that produces image data by capturing an object image formed through focus lens 113, and controller 180. Controller 180 determines tracking range R401 that covers a distance from camera 100 to particular object 401 which is to be performed a focusing operation by focus lens 113. When certain object 402 enters in tracking range R401, controller 180 focuses on certain object 402. If certain object 402 moves out from tracking range R401, controller 180 does not focus on certain object 402. Controller 180 determines tracking range R401 based on the position of particular object 401 as a reference position. When the position of object 401 changes, controller 180 updates tracking range R401 in response to the change.

When digital video camera 100 needs to continue focusing on particular object 401, digital video camera 100 avoids an unnecessary focusing operation caused by certain object 402 entering into the frame. Thus, the distance to particular object 401 may be utilized to perform such convenient focusing operation.

4. Other Embodiments

In the above embodiment, an example of a technique disclosed in this patent application is described; however, the technique disclosed in this application is not limited to the above embodiment and is applicable to other embodiments with a change, replacement, supplement, or omission. The structural elements described in the embodiment can be combined for establishing a new embodiment.

An example of embodiments will be described below.

According to the above embodiment, the point spread functions are stored in internal memory 240; however, the present invention is not limited to this structure, for instance, the point spread functions may be stored in a memory of image processor 160. Digital video camera 100 in accordance with the above embodiment selects sixteen point spread functions; however, the number of the selected point spread functions may be larger than sixteen or smaller than sixteen in response to the number of levels of the depth map.

The image-capturing apparatus in accordance with the above embodiment is a digital video camera. The lens of this camera cannot be replaced; however, the camera is not limited to this structure, and the present invention is applicable to a digital video camera with a replaceable lens.

In the above embodiment, examples of the technique disclosed in the present invention are described with accompanying drawings and detailed descriptions. The structural elements in the drawings or the detailed descriptions include not only elements essential for problems to be solved but also other elements necessary for detailing the examples but not necessary for solving the problems. Although these elements not necessary for solving the problems are described here, they should not be construed as essential elements for the problems to be solved.

The above embodiments only describe examples of the technique disclosed in the present invention, so that various changes, replacements, supplements, or omissions are allowed in the scope of claims described later or an equivalent scope thereto.

The image-capturing apparatus of the present invention is applicable to digital video cameras, digital still cameras, portable-phones with camera function, or smart-phones with camera function.

What is claimed is:

1. An image-capturing apparatus comprising:
a focus lens that focuses on an object as to form an object image from the object;
an image sensor that captures the object image as to produce image data; and
a controller that controls the focus lens,
wherein the controller is operable:

to determine a tracking range along a direction from the image-capturing apparatus toward the object based on a position of a particular object;

to cause the focus lens to focus on a certain object when the certain object is located in the tracking range;

not to cause the focus lens to focus on the certain object when the certain object is located out of the tracking range;

to determine whether or not the position of the particular object changes;

to update the tracking range in response to the position of the particular object if determining that the position of the particular object changes; and to maintain the tracking range if determining that the position of the particular object does not change.

2. The image-capturing apparatus according to claim 1, further comprising an image processor, wherein the focus lens focuses on the particular object as to form a first object image and a second object image when the focus lens is located at a first position and a second position, respectively, wherein the image sensor captures the first object image and the second object image as to produce first image data and second image data, respectively, wherein the image processor is operable:
to determine a defocusing amount based on the first image data and the second image data; and
to produce distance data corresponding to a distance to the particular object based on the determined defocusing amount, and wherein the controller determines, based on the distance data, whether the position of the particular object changes or not.

3. The image-capturing apparatus according to claim 1, wherein the controller causes the focus lens to focus on the particular object when the certain object moves out from the tracking range while the certain object is located in the tracking range and the focus lens focuses on the certain object.

4. The image-capturing apparatus according to claim 1, wherein the controller causes the focus lens to focus on the certain object when the certain object moves into the tracking range from an outside of the tracking range while the focus lens focuses on the particular object.

* * * * *